United States Patent
Ralko et al.

(10) Patent No.: US 6,431,602 B1
(45) Date of Patent: Aug. 13, 2002

(54) METHOD AND APPARATUS FOR SECURING AN ENGINE MOUNT TO A MOTOR VEHICLE BODY

(75) Inventors: Chris E Ralko, White Lake; Harold B Thibodeau, Madison Heights; Louis D DeLellis, South Lyon, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/694,513

(22) Filed: Oct. 23, 2000

(51) Int. Cl.⁷ .............................................. B62D 21/00
(52) U.S. Cl. ..................................................... 280/781
(58) Field of Search ................................. 280/781, 785, 280/788, 797–800; 180/312; 411/338, 384, 383, 535, 546, 1, 4, 6, 8; 296/29, 30, 35.1; 403/187, 188, 194, 200, 201

(56) References Cited

U.S. PATENT DOCUMENTS

| | | | |
|---|---|---|---|
| 611,976 A | * 10/1898 | Ratchford | 411/195 |
| 900,589 A | * 10/1908 | Ratcliffe | 411/262 |
| 1,166,049 A | * 12/1915 | Hyde | 403/290 |
| 2,024,728 A | 12/1935 | Galson | |
| 2,817,557 A | 12/1957 | Reynolds | |
| 2,941,766 A | 6/1960 | Van Ranst | |
| 3,339,953 A | * 9/1967 | Bohn | 403/387 |
| 3,352,343 A | * 11/1967 | Stitt | 403/256 |
| 3,448,949 A | 6/1969 | Kelley | |
| 3,694,895 A | 10/1972 | Werner | |
| 3,726,181 A | * 4/1973 | Dickow et al. | 411/50 |
| 3,762,671 A | 10/1973 | Schulz | |
| 3,831,920 A | 8/1974 | Meldrum et al. | |
| 4,108,407 A | * 8/1978 | Cable et al. | 248/188.4 |
| 4,240,517 A | 12/1980 | Harlow, Jr. et al. | |
| 4,392,545 A | * 7/1983 | Harasaki et al. | 180/294 |
| 4,399,974 A | 8/1983 | Takei | |
| 4,518,292 A | * 5/1985 | Calandra, Jr. | 29/522.1 |
| 4,531,761 A | 7/1985 | von Sivers | |
| 4,720,075 A | 1/1988 | Peterson et al. | |
| 4,747,585 A | 5/1988 | Buvat | |
| 4,753,315 A | * 6/1988 | Fujisaki et al. | 180/292 |
| 4,772,167 A | * 9/1988 | Beals | 411/34 |
| 4,783,039 A | 11/1988 | Peterson et al. | |
| 4,863,329 A | 9/1989 | Wilson | |
| 4,889,458 A | * 12/1989 | Taylor | 411/383 |
| 4,893,779 A | * 1/1990 | Bergelt | 180/292 |

(List continued on next page.)

FOREIGN PATENT DOCUMENTS

FR 2749823 A1 * 12/1997 ........... B65B/69/00

*Primary Examiner*—Lanna Mai
*Assistant Examiner*—Paul Royal, Jr.
(74) *Attorney, Agent, or Firm*—Ralph E. Smith

(57) ABSTRACT

A coupling apparatus for spanning a gap between a first structure and a second structure and fixedly coupling the first and second structures together. The coupling apparatus includes first and second coupling structures, an attachment member and a coupling member. The first coupling structure has an internally threaded cavity and is fixedly coupled to the first structure. The second coupling structure has an externally threaded body and an abutting flange. The externally threaded body threadably engages the internally threaded cavity, permitting the first and second coupling structures to cooperate to span the gap between the first and second structures such that the abutting flange abuts the second structure. The attachment member includes a threaded portion which extends through the first and second coupling structures and threadably engages the coupling member. The attachment member and the coupling member cooperate to generate a clamping force which is transmitted between the first structure, the first and second coupling structures and the second structure to thereby fixedly couple the first and second structures together. A method for fixedly coupling a first structure to a second structure is also provided.

20 Claims, 5 Drawing Sheets

U.S. PATENT DOCUMENTS

| | | | |
|---|---|---|---|
| 4,895,115 A | | 1/1990 | Weber et al. |
| 4,921,203 A | | 5/1990 | Peterson et al. |
| 4,934,861 A | * | 6/1990 | Weeks et al. ............... 403/167 |
| 4,957,279 A | | 9/1990 | Thorn |
| 5,080,335 A | | 1/1992 | Solleder et al. |
| 5,110,081 A | | 5/1992 | Lang, Jr. |
| 5,305,847 A | | 4/1994 | Mefford |
| 5,340,258 A | * | 8/1994 | Simon ....................... 411/339 |
| 5,405,118 A | | 4/1995 | Dietz et al. |
| 5,551,675 A | | 9/1996 | Simuttis et al. |
| 5,624,221 A | * | 4/1997 | Poe ............................ 411/383 |
| 5,639,075 A | | 6/1997 | Tyree |
| 5,743,509 A | | 4/1998 | Kanda et al. |
| 5,746,556 A | * | 5/1998 | Sato ............................ 411/40 |
| 5,899,498 A | * | 5/1999 | Horton ....................... 180/312 |
| 6,019,557 A | * | 2/2000 | Lo et al. ..................... 411/176 |
| 6,056,490 A | * | 5/2000 | Dillemuth et al. .......... 411/271 |
| 6,085,856 A | * | 7/2000 | Law et al. .................. 180/291 |
| 6,167,663 B1 | * | 1/2001 | Nakamoto et al. ....... 411/366.1 |

* cited by examiner

METHOD AND APPARATUS FOR SECURING AN ENGINE MOUNT TO A MOTOR VEHICLE BODY

BACKGROUND OF THE INVENTION

1. Technical Field

The present invention relates generally to automotive vehicles and more particularly to an apparatus for coupling two structures together wherein the coupling apparatus spans a variably-sized gap between the structures.

2. Discussion

Mechanical designers are frequently faced with situations wherein a gap is disposed between two structures that are to be fastened together. Often times the gap is variably sized, with the variation in the size of the gap stemming from part-to-part variation between the structures. Regardless of the variability of the size of the gap, its presence between the two structures can be undesirable as it may render the joint more susceptible to flexure. Accordingly, mechanical designers have developed numerous methods for dealing with the presence of gaps between structures that are to be fastened together.

One common technique, particularly in the automotive industry, is employed when the gap is relatively small and one or both of the structures that are to be fastened together are relatively flexible. In these situations, mechanical designers will often utilize the clamping force that is generated by a fastener to deform one or both of the structures to eliminate the gap. One drawback associated with this practice is that the amount of clamping force that is absorbed by the deformation of one or both of the structures is highly variable and not readily quantifiable.

Furthermore, the technique of employing clamping force to deform one or both of the structures is not very well suited where neither of the structures are readily deformable or where the gap between the two structures is relatively large or highly variable in size. In such situations it is frequently a better option to fill the gap with shims or spacers or to employ a strap to span the gap between the two structures rather than to eliminate the gap through the deformation of one or both of the structures.

The use of various sized shims or spacers is typically avoided where ever possible due to the drawbacks that are associated with the fitting of spacers to a particular arrangement. Often times spacers and shims are not easily installed in an application as the position at which they are to be located can be relatively inaccessible. Shims and spacers are also not always sized properly and thereby alter the distribution of clampload through the joint. These errors may stem from an error in the judgment of the technician installing the shim or spacer, or may result simply because while the gap is infinitely variable in size, the technician must choose from a limited number of spacers, each of which are finitely sized. Because of the above-mentioned drawbacks, the use of shims and spacers can be relatively time consuming and costly.

The use of straps also has several drawbacks, including the additional cost associated with the fabrication and installation of the strap and the tendency of the strap to be ineffective in certain types of situations (e.g., in compression). Often times, the single most important factor in determining the suitability of a strap to secure two structures is the ease with which the strap may be installed. In joining an engine cradle to a vehicle frame rail, for example, the strap may be located at the base of a cylinder block and be relatively inaccessible, particularly where the engine has a V-configuration with a relatively large angle between the banks of the engine (e.g., 90 degrees). In such cases, the banks of the engine prevent a technician from easily accessing the fasteners that secure the strap to the engine cradle and the vehicle frame rails, thereby necessitating the use of relatively complex and fragile low-clearance tooling to install the fasteners. Typically, low-clearance tooling is not durable nor suitable for the transmission of relatively high installation torque's that are often required in such situations. Consequently, it is frequently necessary to employ a fairly labor-intensive secondary process in such situations wherein the fasteners that retain the strap to the engine cradle and the vehicle frame rail are manually tightened to a predetermined minimum torque.

SUMMARY OF THE INVENTION

It is one object of the present invention to provide a coupling apparatus for spanning a gap between two structures and securing the two structures together.

It is another object of the present invention to provide a coupling apparatus that may be easily adjusted to the size of the gap between the two structures.

It is a further object of the present invention to provide a coupling apparatus that accommodates three-dimensional variation between two structures that are to be coupled together.

It is yet another object of the present invention to provide a method for coupling a first structure to a second structure.

In one preferred form, the present invention provides a coupling apparatus for spanning a gap between a first structure and a second structure and fixedly coupling the first and second structures together. The coupling apparatus includes first and second coupling structures, an attachment member and a coupling member. The first coupling structure has an internally threaded cavity and is fixedly coupled to the first structure. The second coupling structure has an externally threaded body and an abutting flange. The externally threaded body threadably engages the internally threaded cavity, permitting the first and second coupling structures to cooperate to span the gap between the first and second structures such that the abutting flange abuts the second structure. The attachment member includes a threaded portion which extends through the first and second coupling structures and threadably engages the coupling member. The attachment member and the coupling member cooperate to generate a clamping force which is transmitted between the first structure, the first and second coupling structures and the second structure to thereby fixedly couple the first and second structures together. A method for fixedly coupling a first structure to a second structure is also provided.

BRIEF DESCRIPTION OF THE DRAWINGS

Additional advantages and features of the present invention will become apparent from the subsequent description and the appended claims, taken in conjunction with the accompanying drawings wherein:

DETAILED DESCRIPTION OF THE PREFERRED EMBODIMENT

Figure 1:
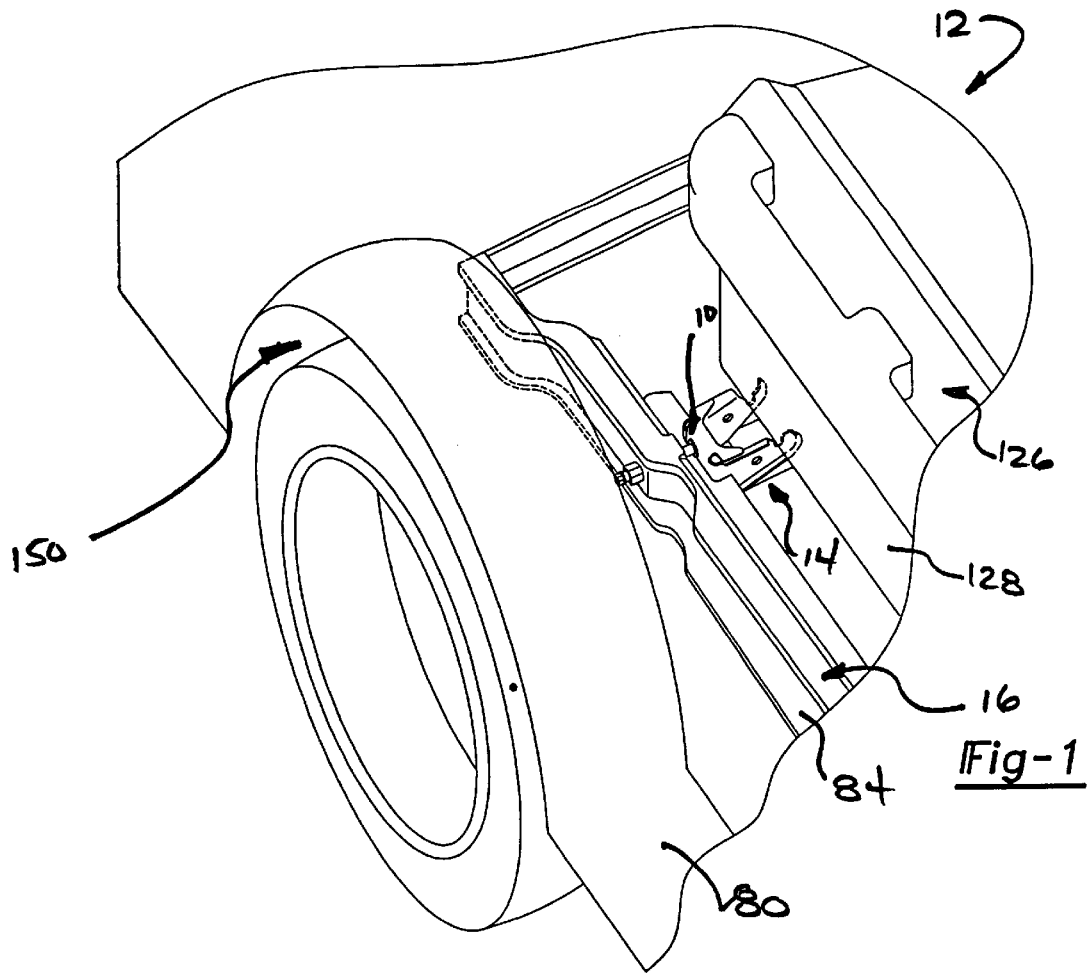
FIG. 1 is a partially broken away perspective view of a portion of a vehicle having a coupling apparatus constructed in accordance with the teachings of the present invention.
Figure 2:
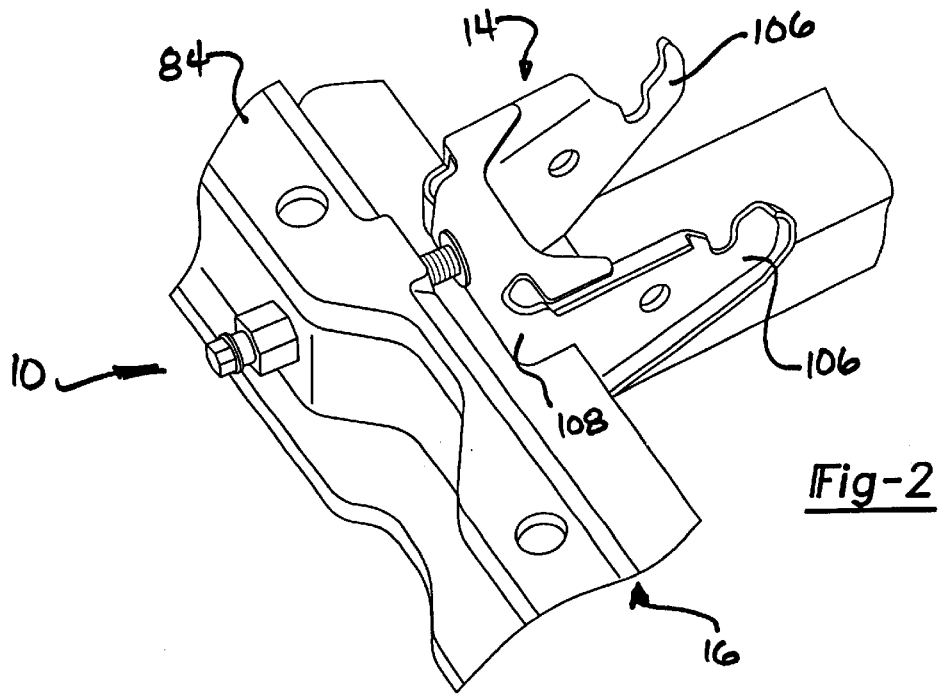
FIG. 2 is an enlarged view of a portion of the vehicle of FIG. 1 illustrating the coupling apparatus as coupled to the vehicle frame rail and the engine cradle.

With reference to FIGS. 1 and 2 of the drawings, a coupling apparatus constructed according to the teachings of the present invention is generally indicated by reference numeral 10. In the particular example illustrated, coupling apparatus 10 is shown to be in operative association with an automotive vehicle 12 wherein coupling apparatus 10 is employed to span a designed gap of about 1 mm to about 3 mm between an engine cradle 14 and a vehicle chassis 16 to fixedly coupled the engine cradle 14 to the vehicle chassis 16. Those skilled in the art will understand that the particular application illustrated is merely exemplary and as such, coupling apparatus 10 may be employed to span gaps having higher magnitudes and/or variability, as well as spanning a designed gap between two structures and fixedly coupling them together.

Figure 3:
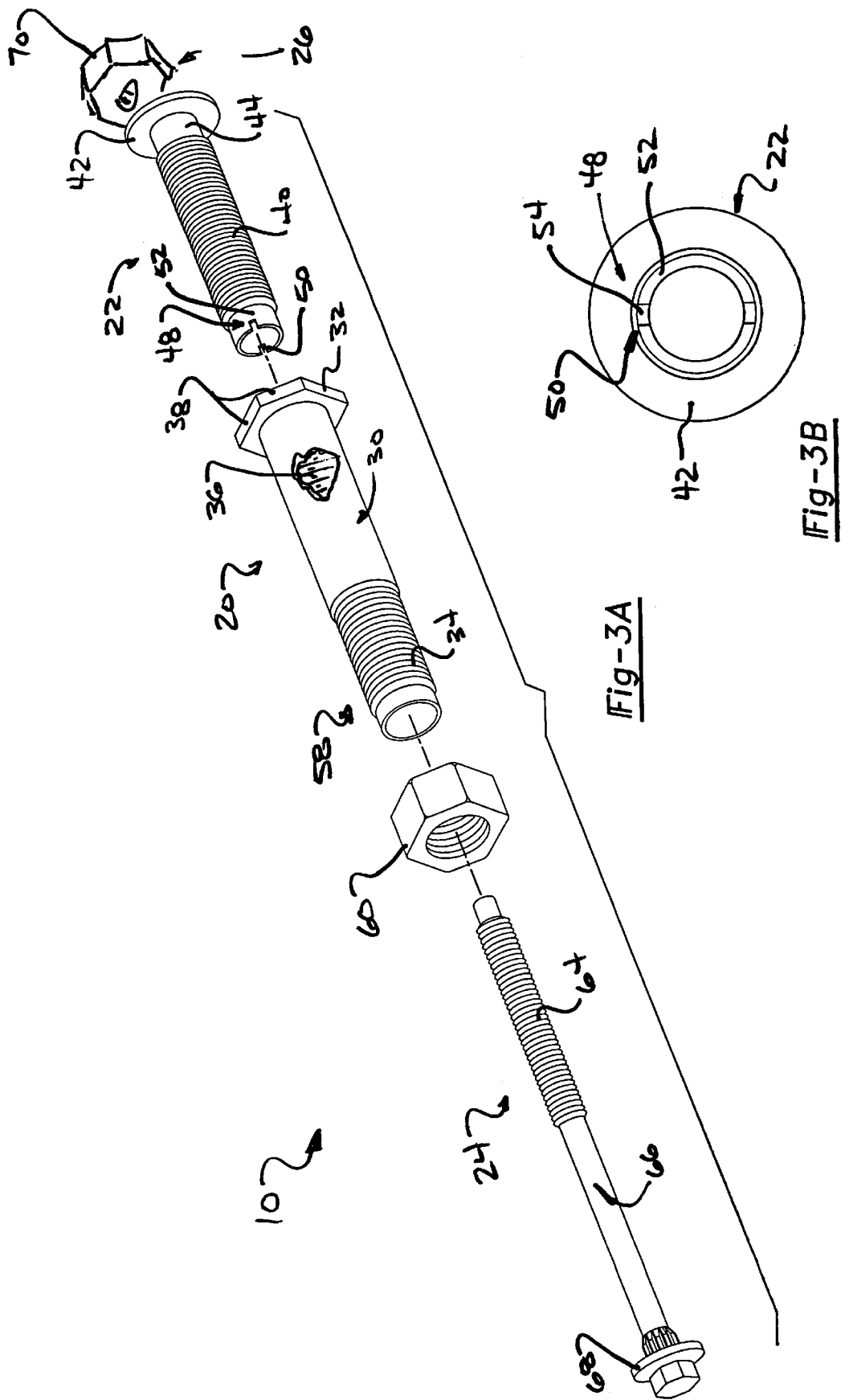
FIG. 3A is an exploded perspective view of a portion of the vehicle of FIG. 1 illustrating the coupling apparatus in greater detail.
FIG. 3B is an end view of a portion of the vehicle of FIG. 1 illustrating the adjusting means for adjusting the position of the abutting flange relative to the first coupling structure.

In FIG. 3A, coupling apparatus 10 is shown to include a first coupling structure 20, a second coupling structure 22, an attachment member 24 and a coupling member 26. In the particular embodiment illustrated, first coupling structure 20 is generally tubular in shape and includes a body portion 30 and a head portion 32. Body portion 30 includes an externally threaded portion 34 and an internally threaded portion 36. Head portion 32 is fixedly coupled to body portion 30 and is preferably shaped with a plurality of generally flat surfaces 38 for engaging a tool, such as a conventional 6-point socket, or a portion of the vehicle chassis 16 to prevent first coupling structure 20 from rotating during the installation of coupling apparatus 10.

Second coupling structure 22 is shown to include a tubular externally threaded body 40 and an abutting flange 42. Externally threaded body 40 is sized to threadably engage the internally threaded portion 36 of first coupling structure 20. A necked-down area 44 is disposed between the externally threaded body 40 and the abutting flange 42 to guard against the creation of relatively large stress risers as well as to improve the ability with which second coupling structure 22 may be fabricated. Abutting flange 42 is shown to be annular in shape and coupled to an end of second coupling structure 22. Externally threaded body 40 is threadably engaged to internally threaded portion 36 such that the distance between the abutting flange 42 and the head portion 32 is preferably less than a predetermined abutting distance.

With additional reference to FIG. 3B, coupling apparatus 10 also preferably includes an adjusting means 48 that is coupled to the second coupling structure 22. The adjusting means 48 is preferably engagable from an end of coupling apparatus 10 opposite second coupling structure 22 to permit the position of abutting flange 42 to be moved relative to first coupling structure 20. In the embodiment illustrated, adjusting means 48 includes a driving adapter 50 formed into a proximal end 52 of second coupling structure 22. Driving adapter 50 may be shaped to receive a rotatable tool to cause second coupling structure 22 to rotate relative to first coupling structure 20. In this regard, driving adapter 50 may have a geometrically shaped cross-section, such as a hex, square or triangular cross-section.

In the particular embodiment illustrated, driving adapter 50 includes a slotted recess 54 formed into the proximal end 52 of second coupling structure 22. Slotted recess 54 is sized to receive a slotted (i.e., flat-bladed) screwdriver or screwdriver bit (not shown) which is introduced through first coupling structure 20 to permit the position of abutting flange 42 to be altered from a person situated at the proximal end 58 of first coupling structure 20 of coupling apparatus 10.

Returning to FIG. 3A, a conventionally formed first internally threaded nut 60 is threadably engaged to the externally threaded portion 34 of first coupling structure 20. Attachment member 24 is shown to include a threaded portion 64 which extends through first and second coupling structures 20 and 22. Coupling member 26 threadably engages the threaded portion 64 of attachment member 24 and cooperates with attachment member 24 to generate a clamping force which is employed to retain engine cradle 14 to vehicle chassis 16. In the particular embodiment illustrated, attachment member 24 is illustrated to include a bolt 66 and a spherically shaped washer 68 and coupling member 26 is illustrated to include a second internally threaded nut 70. Bolt 66 is inserted through first and second coupling structures 20 and 22 such that washer 68 contacts the proximal end of first coupling structure 20. Second internally threaded nut 70 is threadably engaged to the threaded portion of bolt 66 that extends outwardly from second coupling structure 22.

Referring back to FIGS. 1, 2 and 5, vehicle chassis 16 is illustrated as being the foundation of vehicle 12, providing support for components such as a vehicle body 80 and engine cradle 14. Vehicle chassis 16 includes a pair of laterally extending frame rail structures 84 which are oriented generally parallel the longitudinal axis of vehicle 12. In the particular embodiment illustrated, each of the frame rail structures 84 includes a rail member 90 and a tube member 92. Rail members 90 are formed from a plurality of rail components 91 which are welded together to form a structure having a generally hollow interior 94. Tube members 92 are inserted through tube apertures 96 formed into the rail members 90 and fixedly coupled to thereto via a suitable fastening process, such as welding. Tube members 92 strengthen rail members 90 to permit a clamping force to be transmitted through frame rail structures 84 without crushing rail members 90.

Figure 4:
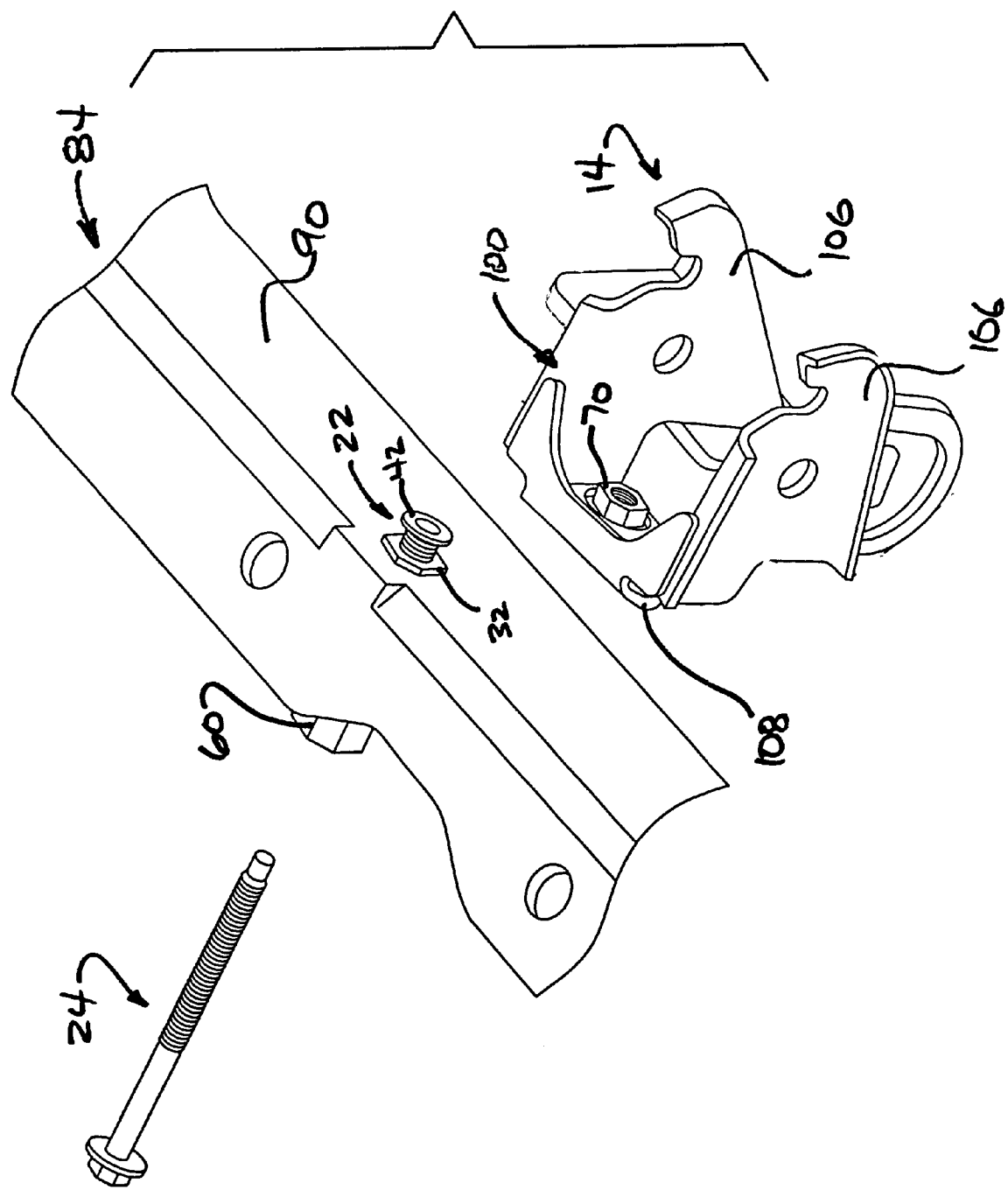
FIG. 4 is an exploded perspective view of a portion of the vehicle of FIG. 1 illustrating the engine cradle and attachment member exploded from the vehicle frame rail.

With additional reference to FIG. 4, engine cradle 14 is illustrated to include a cradle structure 100, a tapping pad 102 and a positioning bracket 104. Cradle structure 100 is formed from a sheet steel material and includes a pair of forks 106 which extend generally perpendicularly from a body portion 108. Cradle structure 100 includes an oversized mounting aperture 110 which will be discussed in detail below. Tapping pad 102 includes a generally flat plate member 112 and the second internally threaded nut 70 of coupling apparatus 10 which is fixedly coupled to plate member 112. Positioning bracket 104 includes a mounting portion 116 and a positioning portion 118. Mounting portion 116 is adapted to be fixedly secured to body portion 108 through a conventional fastening process, such as welding. Positioning portion 118 is offset from mounting portion 116 by an amount which exceeds the thickness of plate member 112. Positioning portion 118 includes a positioning aperture 120 through which second internally threaded nut 70 is disposed.

A pair of engine cradles 14 are fixedly coupled to the opposite sides of an engine 126 to permit the engine 126 to be mounted to the vehicle chassis 16. In the particular embodiment illustrated, each pair of forks 106 abut a mounting lug (not specifically shown) formed into the base of the cylinder block 128 of the engine 126. A threaded fastener (not shown) extends through the mounting lug and the associated pair of forks 106 and applies a clamping force which fixedly couples the cylinder block 128 to the engine cradle 14.

Figure 5:
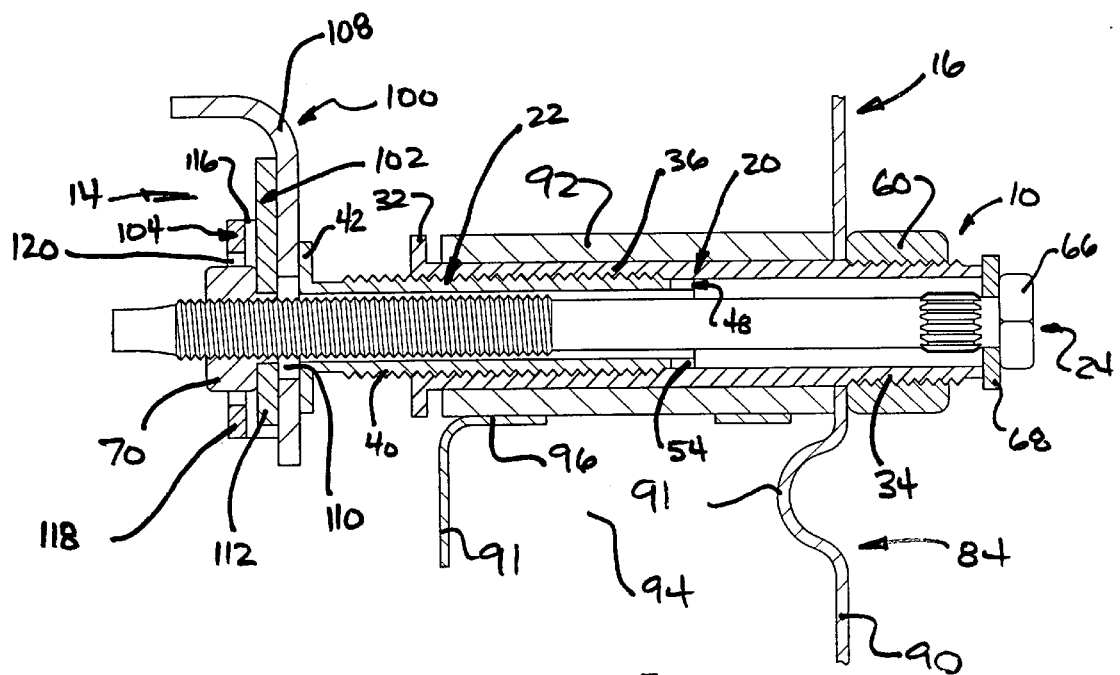
FIG. 5 is a longitudinal cross-sectional view of a portion of the vehicle of FIG. 1.

With reference to FIGS. 4 and 5, second coupling structure 22 is threadably engaged to the internally threaded portion 36 of first coupling structure 20 such that the distance between the abutting flange 42 and the head portion 32 is less than a predetermined abutting distance. First coupling structure 20 is then disposed through one of the tube members 92 and first internally threaded nut 60 is threadably engaged to the externally threaded portion 34 of first coupling structure 20. The head portion 32 of first coupling structure 20 is configured to permit a technician to employ a conventional wrench to hold first coupling structure 20 stationary while first internally threaded nut 60 is tightened to a predetermined torque. Tube member 92 prevents rail member 90 from being crushed by the clamping force generated by first coupling structure 20 and first internally threaded nut 60.

Engine cradle 14 (while attached to engine 126) is subsequently positioned between the frame rail structures 84. A slotted screwdriver (not shown) is engaged to the slotted recess 54 of adjusting means 48 and second coupling structure 22 is rotated until abutting flange 42 is abutted against the body portion 108 of cradle structure 100. Those skilled in the art will understand that second coupling structure 22 may be rotated until contact is made between body portion 108 and abutting flange 42 or until the occurrence of a predetermined event, such as the exertion of a predetermined torque (e.g., 5 inch-pounds) onto the second coupling structure 22 and/or the rotation of the second coupling structure 22 through a predetermined angle of rotation (e.g., ¼ turn or 90°). The abutting of the abutting flanges 42 against their respective cradle structure 100 ensures that the gap that would otherwise exist between the frame rail structures 84 and engine cradle 14 is eliminated.

Attachment member 24 is next disposed through first and second coupling structures 20 and 22 and threadably engaged to second internally threaded nut 70. Cradle structure 100, tapping pad 102 and positioning bracket 104 cooperate to permit second internally threaded nut 70 to move relative to the body portion 108 of cradle structure 100 so that vehicle-to-vehicle variation does not encumber or inhibit the engagement of the threaded portion 64 of attachment member 24 with coupling member 26. Bolt 66 is tightened to permit attachment member 24 and coupling member 26 to cooperatively generate a clamping force which is transmitted between the frame rail structure 84, the first and second coupling structures 20 and 22 and the engine cradle 14 to thereby fixedly couple the frame rail structure 84 and the engine cradle 14 together.

The configuration illustrated is highly advantageous in that the positioning of the abutting flange 42 as well as the coupling of the attachment member 24 to the coupling member 26 may be undertaken from the outer side of vehicle 12 (e.g., through the vehicle wheel well 150 (FIG. 1)). Accordingly, configuration of coupling apparatus 10 in this manner eliminates the need for expensive and relatively fragile low-clearance tooling that would otherwise be necessary for strapping the engine cradle 14 to the vehicle chassis 16.

Figure 6:
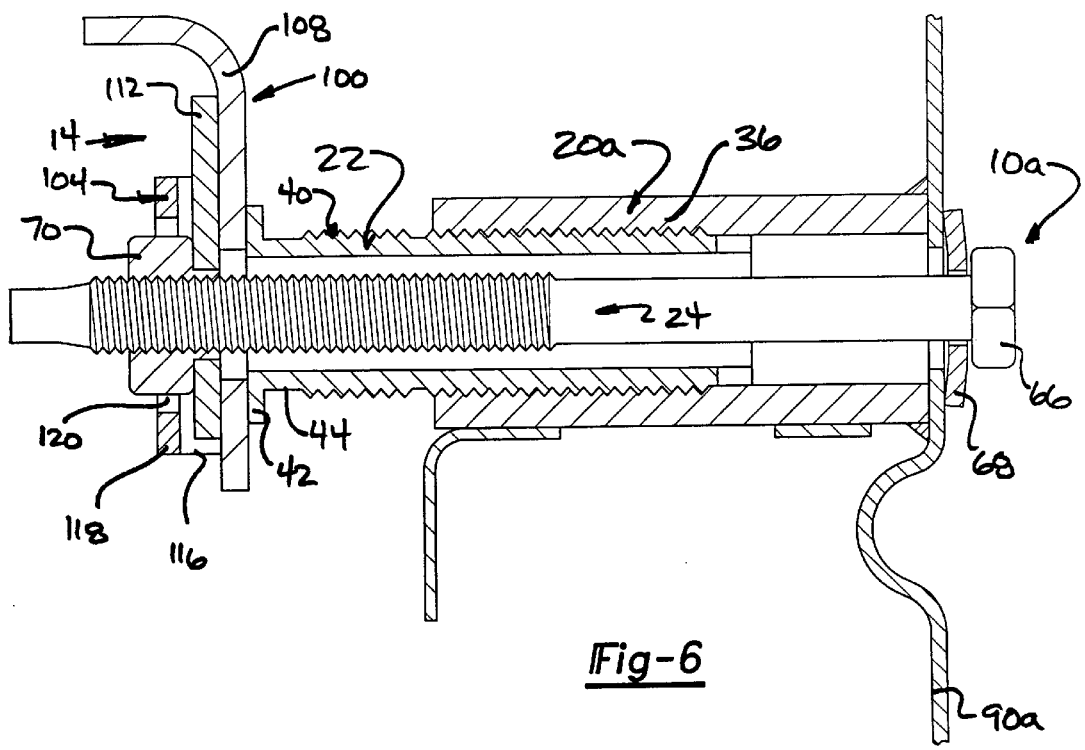
FIG. 6 is a longitudinal cross-sectional view similar to FIG. 5 but illustrating a coupling apparatus constructed in accordance with a first alternate embodiment of the present invention.

While the coupling apparatus 10 has been described thus far with reference to a preferred embodiment, those skilled in the art will appreciate that the invention, in its broader aspects, may be constructed somewhat differently. For example, the first coupling structure 20a may be fixedly coupled to the rail member 90a as illustrated in FIG. 6. In this arrangement, first coupling structure 20a is fixedly coupled to rail member 90a via a conventional fastening process, such as welding. First coupling structure 20a does not include an externally threaded portion or a head portion, but is otherwise identical to first coupling structure 20. Construction in this manner is advantageous in that it eliminates tube member 92 as well reduces the amount of installation labor associated with the coupling apparatus 10a.

Figure 7:
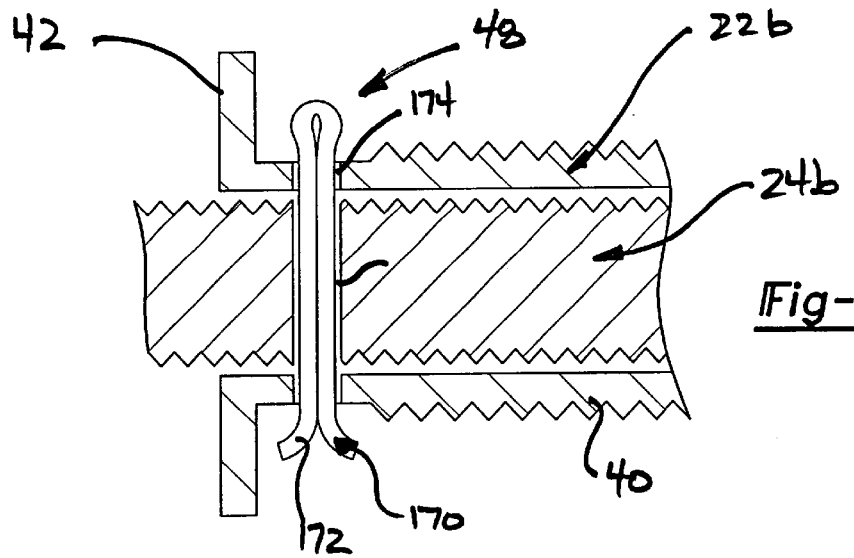
FIG. 7 is a longitudinal cross-sectional view similar to FIG. 5 but illustrating a coupling apparatus constructed in accordance with a second alternate embodiment of the present invention.

Another alternate embodiment is illustrated in FIG. 7. This arrangement is similar to coupling apparatus 10 except that adjusting means 48 includes a shearable member 170 which rotatably couples the second coupling structure 22b with the attachment member 24b. Shearable member 170 is shearable upon receipt of a torque in excess of a predetermined shearing torque to permit attachment member 24b to rotate independently of second coupling structure 22b. In the particular embodiment illustrated, the shearable member 170 is a pin 172 disposed through a hole 174 in the second coupling structure 22b and a hole 176 in the attachment member 24b. This configuration is advantageous in that a separate screwdriver tool is not required to adjust the position the second coupling structure 22b.

Figure 8:
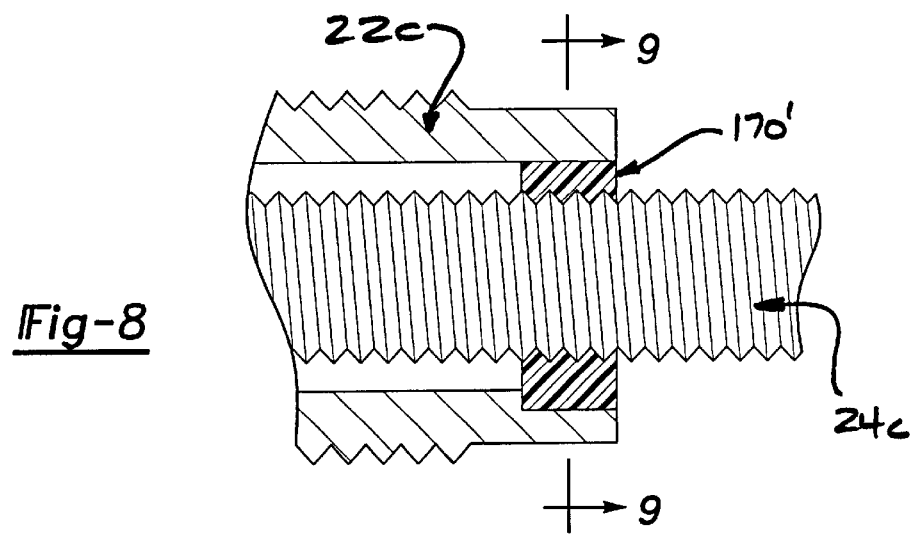
FIG. 8 is a cross-sectional view of a coupling apparatus constructed in accordance with a third alternate embodiment of the present invention, the view being taken along an axis perpendicular to the longitudinal axis of the coupling apparatus.
Figure 9:
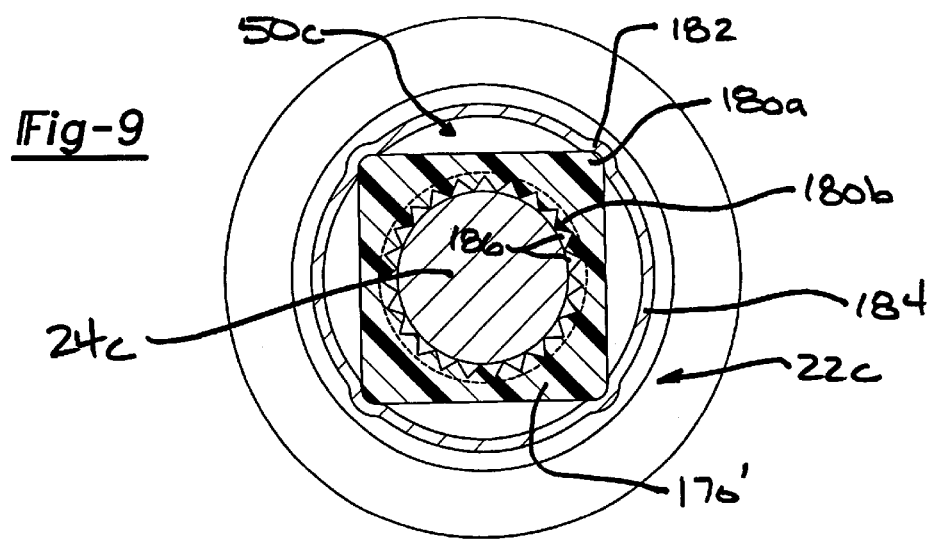
FIG. 9 is a cross-sectional view taken along arrows 9 of FIG. 8.

Alternatively, the shearable member 170' may be constructed as shown in FIGS. 8 and 9. In this arrangement, the shearable member 170' includes at least one tooth member for engaging one of the attachment member 24c and the second coupling structure 22c. In the particular embodiment illustrated, shearable member 170' includes a plurality of first teeth members 180a which engage a plurality of ridges 182 formed into the perimeter 184 of attachment member 24c and a plurality of second teeth members 180b which engage a plurality of teeth 186 formed into attachment member 24c. Shearable member 170' is formed from a plastic material in the shape of a square. First and second teeth members 180a and 180b cooperate with ridges 182 and teeth 186 to form a driving adapter 50c which transmits rotary motion to second coupling structure 22c when attachment member 24c is rotated. Upon receipt of a torque in excess of a predetermined shearing torque, the plurality of teeth 180a and/or 180b shear, permitting attachment member 24c to rotate independently of second coupling structure 22c.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A coupling apparatus for spanning a gap between a first structure and a second structure and fixedly coupling the first and second structures together, the coupling apparatus comprising:

a first coupling structure having an internally threaded cavity, the first coupling structure adapted to be fixedly coupled to the first structure;

a second coupling structure having an externally threaded body, an abutting flange and a central cavity, the externally threaded body threadably engaging the internally threaded cavity, the first and second coupling structures being adapted to cooperate to span the gap between the first and second structures to permit the abutting flange to abut the second structure;

an attachment member having a threaded portion, the attachment member extending through the first and second coupling structures; and a coupling member threadably engaging the threaded portion of the attachment member, the attachment member and the coupling member cooperating to generate a clamping force which is adapted to be transmitted between the first structure, the first and second coupling structures and the second structure to thereby fixedly couple the first and second structures together.

2. The coupling apparatus of claim 1, wherein the first coupling structure includes a body portion and an internally threaded nut, the body portion having a head portion and an externally threaded portion, the externally threaded portion threadably engaging the internally threaded nut.

3. The coupling apparatus of claim 2, wherein the head portion is hexagonally shaped.

4. The coupling apparatus of claim 1, wherein the first coupling structure includes a weld flange to permit the first coupling structure to be welded to the first structure.

5. The coupling apparatus of claim 1, further comprising adjusting means coupled to the second coupling structure, the adjusting means engagable from a proximal end of the internally threaded cavity of the first coupling structure opposite the second coupling structure to permit a position of the abutting flange to be moved relative to the first coupling structure.

6. The coupling apparatus of claim 5, wherein the adjusting means includes a driving adapter formed into a proximal end of the second coupling structure.

7. The coupling apparatus of claim 6, wherein the driving adapter is a slotted recess formed into the proximal end of the second coupling structure.

8. The coupling apparatus of claim 5, wherein the adjusting means includes a shearable member rotatably coupling the second coupling structure with the attachment member, the shearable member being shearable upon receipt of a torque in excess of a predetermined shearing torque to permit the attachment member to rotate independently of the second coupling structure.

9. The coupling apparatus of claim 8, wherein the shearable member is a pin disposed through a hole in the second coupling structure and a hole in the attachment member.

10. The coupling apparatus of claim 8, wherein the shearable member includes at least one tooth member for engaging one of the attachment member and the second coupling structure.

11. The coupling apparatus of claim 10, wherein the tooth member shears upon receipt of the predetermined shearing torque.

12. The coupling apparatus of claim 1, wherein the attachment member includes a threaded fastener and a washer.

13. The coupling apparatus of claim 12, wherein the washer is spherically shaped.

14. A method for coupling a first structure to a second structure, the method comprising the steps of:

providing a coupling apparatus having a first coupling structure and a second coupling structure, the first coupling structure having an internally threaded cavity, the second coupling structure having an externally threaded body, an abutting flange and a central cavity, the externally threaded body threadably engaging the internally threaded cavity;

securing the first coupling structure to the first structure;

positioning the second structure at a predetermined position relative to the first structure;

rotating the second coupling structure relative to the first coupling structure to bring the abutting flange into abutment with the second structure;

inserting a threaded fastener through the first and second coupling structures; and threadably engaging the threaded fastener to a nut to generate a clamping force that fixedly couples the first and second structures together.

15. The method of claim 14, wherein the step of securing the first coupling structure to the first structure includes the steps of:

forming a hole in the first structure;

inserting the first coupling structure through the hole in the first structure; and threadably engaging a nut to an externally threaded portion of the first coupling structure to fixedly couple the first coupling structure to the first structure.

16. The method of claim 14, wherein the step of securing the first coupling structure to the first structure includes the steps of:

abutting the first coupling structure against the first structure; and welding the first coupling structure to the first structure.

17. The method of claim 14, wherein the step of inserting the threaded fastener through the first and second coupling structures is performed prior to rotating the second coupling structure relative to the first coupling structure and the threaded fastener is employed to rotate the second coupling structure.

18. A motor vehicle comprising:

a vehicle frame rail structure;

an engine cradle structure adapted for carrying an engine, the engine cradle structure being in a spaced relation to the frame rail structure, the engine cradle structure cooperating with the frame rail structure to define a gap therebetween; and a coupling apparatus having first and second coupling structures, an attachment member and a coupling member, the first coupling structure having an internally threaded cavity and being fixedly coupled to the frame rail structure, the second coupling structure having an externally threaded body and an abutting flange, the externally threaded body threadably engaging the internally threaded cavity, the first and second coupling structures cooperating to span the gap between the vehicle frame rail structure and the engine cradle structure such that the abutting flange abuts the engine cradle structure, the attachment member having a threaded portion which extends through the first and second coupling structures, the coupling member threadably engaging the threaded portion of the attachment member, the attachment member and the coupling member cooperating to generate a clamping force which is transmitted between the vehicle frame rail structure, the first and second coupling structures and the engine cradle structure to fixedly couple the vehicle frame rail structure and the engine cradle structure together.

19. The vehicle of claim 18, wherein the coupling member is slidingly engaged to the engine cradle structure.

20. The vehicle of claim 18, wherein the first coupling structure is fixedly welded to the vehicle frame rail structure.

* * * * *